United States Patent [19]

Matusek

[11] 4,456,863
[45] Jun. 26, 1984

[54] APPARATUS FOR AUTOMATIC CALIBRATION OF SERVO RESPONSE

[75] Inventor: Robert D. Matusek, Parma, Ohio

[73] Assignee: Cleveland Machine Controls, Inc., Cleveland, Ohio

[21] Appl. No.: 220,150

[22] Filed: Dec. 23, 1980

[51] Int. Cl.³ .......................................... G05B 19/24
[52] U.S. Cl. ...................................... 318/572; 318/632; 318/625
[58] Field of Search ................ 318/572, 632, 625; 364/474

[56] References Cited

U.S. PATENT DOCUMENTS

| | | | |
|---|---|---|---|
| 2,988,681 | 6/1961 | Bower | 318/632 X |
| 3,447,050 | 5/1965 | Geis | 318/67 |
| 3,539,896 | 11/1970 | Reuteler et al. | 318/571 |
| 3,555,252 | 1/1971 | Garden | 235/151.1 |
| 3,555,254 | 1/1971 | Gerber | 318/632 |
| 3,673,400 | 6/1972 | Ito | 235/196 |
| 3,693,064 | 9/1972 | Kiwiet | 318/571 |
| 3,798,431 | 3/1974 | Schulkind et al. | 235/151.12 |
| 3,828,168 | 8/1974 | O'Callaghan et al. | 318/632 X |
| 3,873,816 | 5/1975 | Takeyama et al. | 235/151.11 |
| 3,893,616 | 7/1975 | Trousdale | 235/151 |
| 3,917,930 | 11/1975 | Davey et al. | 235/151.11 |
| 4,062,648 | 12/1977 | Hennessee | 364/105 |
| 4,101,817 | 7/1978 | Maeda et al. | 318/632 X |
| 4,140,953 | 2/1979 | Dunne | 318/632 X |
| 4,150,327 | 4/1979 | Camera et al. | 318/568 |
| 4,330,831 | 5/1982 | Schwefel | 318/572 X |

FOREIGN PATENT DOCUMENTS 389490 5/1973 U.S.S.R. .................. 318/632

Primary Examiner—B. Dobeck
Attorney, Agent, or Firm—Yount & Tarolli

[57] ABSTRACT

An improved plural axis motion controller (34) is disclosed for controlling servos (14, 16) to move an object (18) such as a flame cutter along a predetermined path. A microcomputer (42) periodically reads the location of the object from position counters (56, 58) and recalculates new velocity control signals for application to the servos in order to cause the object to follow the predetermined path. The improvement is wherein the controller automatically modifies the velocity control signals so as to reduce the spurious velocity variations which the object would otherwise experience due to the nonuniform rate responses of the servos. A table of modifiers, determined during a prior calibration procedure, is stored in a calibration memory (60). The microcomputer selects an appropriate modifier for each velocity control signal in accordance with the direction and magnitude of that control signal and the servo to which it is to be directed.

12 Claims, 7 Drawing Figures

APPARATUS FOR AUTOMATIC CALIBRATION OF SERVO RESPONSE

BACKGROUND AND FIELD OF THE INVENTION

The present invention relates to servo control systems, and more particularly to means for automatically calibrating response of servos to control signals provided thereto in a system providing positional, but not velocity, feedback.

Control systems are presently available for controlling the motion of flame cutters or other implements in two dimensions so as to, for example, cut a predetermined series of geometric shapes from a plate of metal stock. One control system presently available utilizes positional feedback in order to derive control signals for the servos which control motion of the flame cutters in the two dimensions. The controller reads the present position of the flame cutter, as represented by the positional feedback signals, and then determines the direction in which the flame cutter must travel in order to follow or return to the desired cutting path. Velocity commands are then generated for the several servos to cause the cutter to travel along this path. The accuracy with which the flame cutters may be forced to follow a predetermined path is determined by the feed rate of the flame cutter and the frequency with which the velocity commands of the various servos are updated. This accuracy may be quite good if velocity commands are recalculated very rapidly.

It is desirable that the speed of the flame cutter as it follows the desired path remain uniform, since the characteristics of the cut are dependent upon the velocity at which the flame cutter moves. In order to provide a uniform feed rate, the velocity commands provided to the various servos are normalized by the control system so that their vector sum remains constant. This is not a sufficient condition to establish uniform feed rate, however, since the different servos may have different response characteristics. It therefore cannot be presumed that simply because the velocity commands have a uniform vector sum, the servo speeds will similarly have a constant vector sum.

SUMMARY OF THE INVENTION

In accordance with one aspect of the present invention, velocity command signals generated as in the prior art system described above are modified in accordance with calibration signals stored in a calibration memory, where these calibration signals have values selected so as to eliminate variations in driven object velocity due to nonuniform servo response characteristics.

The calibration signals which are used to modify the velocity commands applied to the servos are selected from a table of previously derived calibration values. These calibration values are derived during a calibration procedure undertaken before normal operation of the apparatus. During the calibration procedure velocity commands are provided to the servos and positional feedback information utilized to detect differences in servo characteristics.

More specifically, the same velocity command is applied to all of the servos, and the positional change of the object (e.g., flame cutter) determined after a predetermined interval of time. The velocity commands are then reapplied to the servos, after having first been modified so that positional changes due to the respective servos are more closely matched in the second iteration. This procedure is continued iteratively until the positional changes caused by each of the servos are essentially the same. Calibration signals corresponding to the velocity commands which produced the similar positional changes are then stored in the calibration table. It is these calibration signals which are thereafter utilized to modify servo commands during the normal operation of the servo system.

BRIEF DESCRIPTION OF THE DRAWINGS

The foregoing and other objects and advantages of the present invention will become more readily apparent from the following detailed description, as taken in conjunction with the accompanying drawings, wherein.

DETAILED DESCRIPTION

Figure 1:
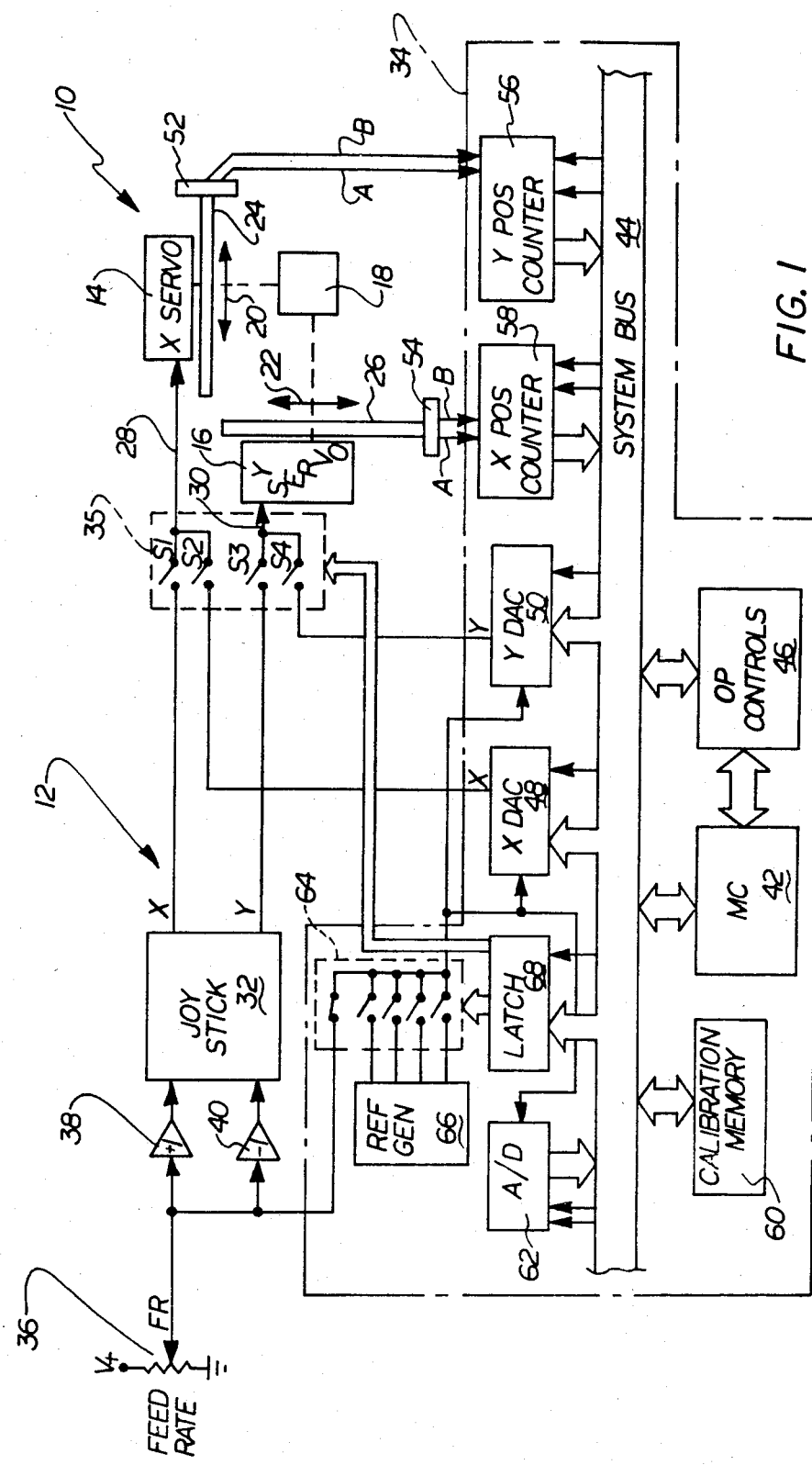
FIG. 1 is a block diagram of a two-dimensional servo system and associated control network in accordance with the teachings of the present invention.

There is shown in FIG. 1 a two-dimensional motion controller 10 and its associated control system 12. The motion controller 10 includes X and Y servos 14 and 16 which respectively control movement of an object 18 along two orthogonal axes 20 and 22. These X and Y servos 14 and 16 may, for example, comprise bi-directional DC servo motors coupled through pinion gears (not shown) to respective racks 24 and 26, where the object 18 is coupled to and moves with the racks 24 and 26 so that the motion of the object 18 in two dimensions is directly controlled by the rack and pinion arrangements and hence by servos 14 and 16. These object 18 whose motion is controlled in this fashion may comprise a flange cutting tool disposed above a plate of sheet metal, a series of flame cutting tools held in a fixed array, or some other tool or object.

Movement of the object 18 is controlled by DC velocity command signals provided to the servos along input lines 28 and 30, respectively, which may be derived from a manually controlled joystick 32 or from an automatic control system, generally indicated at 34.

The X and Y outputs of the joystick 32 and the automatic control system 34 are routed through a 4:2 analog multiplexor 35. This multiplexor, which is shown as an array of four solid state switches, is controlled by digital signals stored in a latch 68 (described hereinafter) and may have any one of three different states. In one state, switches S1 and S3 are "closed", connecting the X and Y outputs of the joystick 32 to the respective servos 14 and 16, and switches S2 and S4 are "open". In a second state switches S1 and S3 are "open" and switches S2 and S4 are "closed", connecting the X and Y outputs of the control system 34 to the servos. In the third state all switches S1–S4 are "open", hence the servos 14 and 16 are disconnected and are thus "off".

The joystick 32 has a conventional form, consisting of four SPST switches coupled to a single control lever. By moving the lever in two dimensions the operator can close any one of the four switches. Only one will be closed at any given time, however. Each switch connects an associated input to an associated output. Thus, by movement of the lever, either of the input potentials can be applied to either of the outputs. When the lever is centered, all of the switches are open.

The potentials applied to the joystick 32 are derived from a feed rate potentiometer 36 which may also be manually varied. The potential appearing at the wiper arm of the feed rate potentiometer 36 is applied across the joystick 32 by two buffer amplifiers 38 and 40, one noninverting and the other inverting. Equal and opposite potentials are thus applied to the joystick 32. With this arrangement, the velocity at which the object 18 is transported by the actuated X or Y servo will be directly related to the feed rate potential FR, which is in turn controlled by the setting of the feed rate potentiometer 36. The direction of travel of the object 18, on the other hand, will be controlled by the orientation of the operating lever of the joystick 32, which controls the output to which the potential is applied, and the polarity of the applied potential.

The direction of movement of the controlled object 18 may alternatively be controlled by the digital control system 34. Digital control system 34 includes a microcomputer 42 of conventional form, including a microprocessor, read-only and random-access memory, associated timers, etc. This microcomputer 42 is interfaced with the remainder of the digital control system 34 through a system bus 44. This system bus includes address, data and control lines, all of which are controlled by the microcomputer 42. The operation of the microcomputer 42 is controlled by the operator through operator controls 46 which interface with the microcomputer 42 both directly and through the system bus 44. Microcomputer 42 derives X and Y vector commands and load these commands, in a sign/magnitude format, into corresponding multiplying digital-to-analog converters 48 and 50. The digital-to-analog converters provide bi-directional analog signals at their outputs which correspond to the product of the vector commands and an analog reference signal provided in common to both converters.

The microcomputer 42 provides vector commands which are normalized so that their vector sum will be fairly constant. Consequently, the velocity at which the object 18 is transported is directly dependent upon the reference signals provided to the converters 48 and 50, whereas the direction of movement of the object 18 will be determined by the vector commands provided to the converters. The reference input to the converters 48 and 50 will normally be the feed rate signal appearing at the wiper arm of the feed rate potentiometer 36, but will instead be derived from a reference generator during a calibration procedure to be described hereinafter.

In order to maintain the object 18 on a predetermined path, the microcomputer 42 responds to positional feedback signals derived from the bi-directional servo mechanism 10. To provide this positional feedback, quadrature encoders 52 and 54 are respectively coupled to the respective axes through separate, precision rack and pinion arrangements, not shown. Each quadrature encoder provides pulses on two output lines A and B to an associated position counter 56 and 58. These position counters 56 and 58 each store a count representing the present location of the object 18 along the respective axis 20 or 22 with which that position counter is associated. These stored counts will each be incremented or decremented in accordance with pulses provided on the A and B outputs of the correspondingly associated quadrature encoder.

The quadrature encoders 52 and 54 provide one pulse on each of the output lines for each incremental movement of the rack with which that quadrature encoder is associated. The relative time of occurrence of the pulses on the two output lines A and B will depend upon the direction of movement of the associated rack. Thus, when the rack is translated in one direction, pulses on output A will precede pulses on output B. In this case the count contained within the respectively associated counter will be incremented with each of the pulses appearing on the output line A. When the rack is translated in the opposite direction, however, the pulses on output A will follow pulses on output B. In this case, the count contained within the associated counter will be decremented with the pulses appearing on output A. In this fashion, the count stored in the X and Y position counters 56 and 58 will follow the movement of the object 18 along both axes 20 and 22.

The microcomputer 42 periodically reads the contents of the two counters 56 and 58 in order to determine the present position of the object 18, and determines new X and Y vector commands from the position thus determined. These new X and Y vector commands define the direction that the object 18 must move to continue along (or return to) the desired trajectory. Since new position readings are taken and new vector commands calculated quite frequenty (every five miliseconds or so) the object 18 can be forced to follow a defined path quite closely.

The system thus far described, wherein the microcomputer 42 is programmed to calculate new X and Y vector commands in accordance with the difference between the contents of the X and Y position counters 56 and 58 and a pre-programmed course, has been available in the prior art. As stated previously, however, the system as thus configured and programmed does not insure that the object 18 will travel at a uniform velocity as it follows a pre-programmed course. This is because the microcomputer 42 responds only to the positional changes of the object, and not to velocity variations thereof. Although the X and Y vector commands are normalized so that their vector sum will remain substantially constant, the response of the X and Y servos may be sufficiently different to introduce substantial variations in the velocity of the object 18 as it follows its programmed path.

In accordance with the present invention, the microcomputer 42 calculates the X and Y vectors not only upon the basis of the present position of the flame cutter 18, but also upon calibration values stored within a calibration memory 60, where the calibration values characterize the differences in response characteristics of the servos being controlled. In operation, the microcomputer 42 reads the values contained within the counters 56 and 58, and calculates X and Y vector commands as in the past. These X and Y vector commands are then multiplied by the feed rate (as indicated by the output of analog-to-digital converter 62) in order to obtain X and Y signals representative of the desired true speed of the respective servos. These true X and Y speed values are each then used to access a table of modifiers stored within the calibration memory 60, which is interfaced with the microcomputer through the system bus. (Preferably, this memory will be of the low power dissipation variety and will have a battery backup power supply so that it can retain its contents even when the machine is switched off.) The X and Y modifiers thus obtained are combined with the X and Y vector commands previously determined to provide modified X and Y vector commands for provision to the X and Y digital-to-analog converters 48 and 50. The modifiers modify the X and Y vector commands to such an extent that the modified X and Y vector commands has the values necessary to produce the desired response from the respective X and Y servos.

An analog-to-digital converter 62 responds to the analog reference signals provided to the X and Y digital-to-analog converters 48 and 50 to provide a digitized version thereof to the system bus 44 for use by the microcomputer 42 in the above procedure. The analog-to-digital converter 62 is, again, controlled by the microcomputer 42 through the system bus 44.

Figure 2:
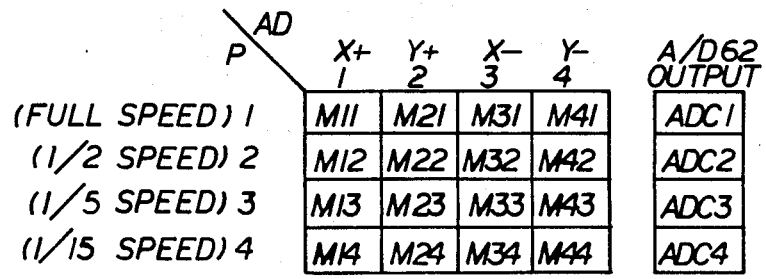
FIG. 2 is a chart useful in understanding the nature and function of the calibration table stored within the memory of the apparatus of FIG. 1; and, FIGS. 3-7 are flow charts detailing the functions performed by the microprocessor incorporated in the system of FIG. 1.
Figure 3:
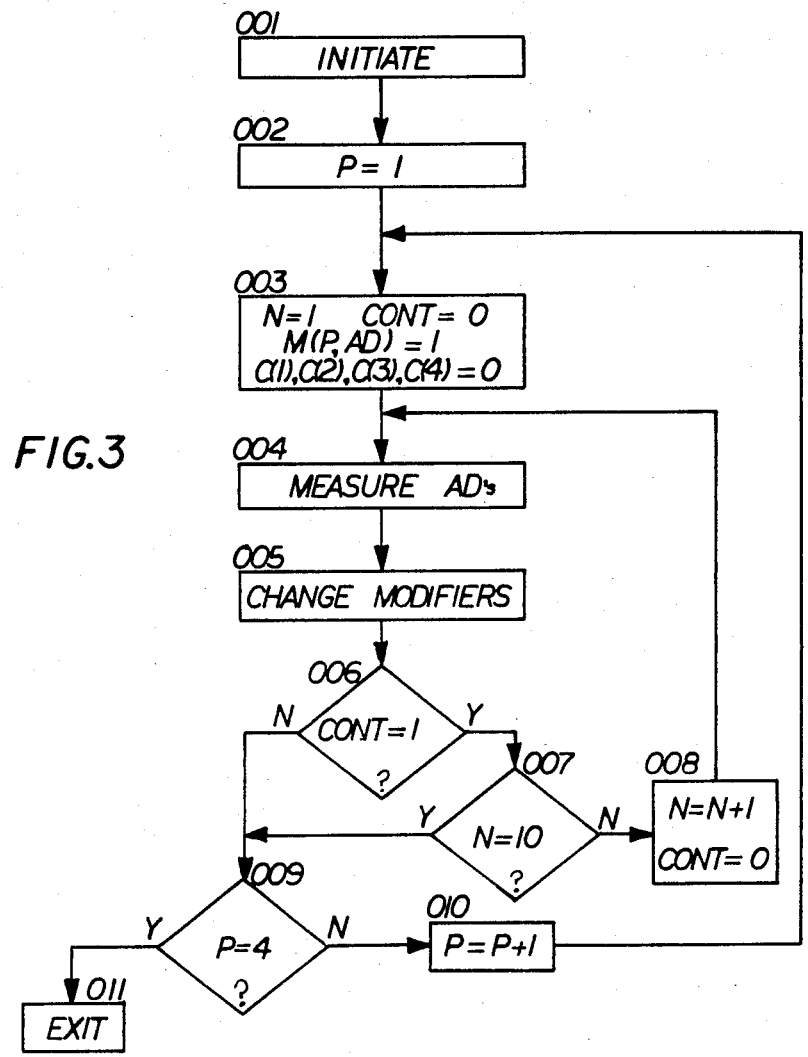
Figure 4:
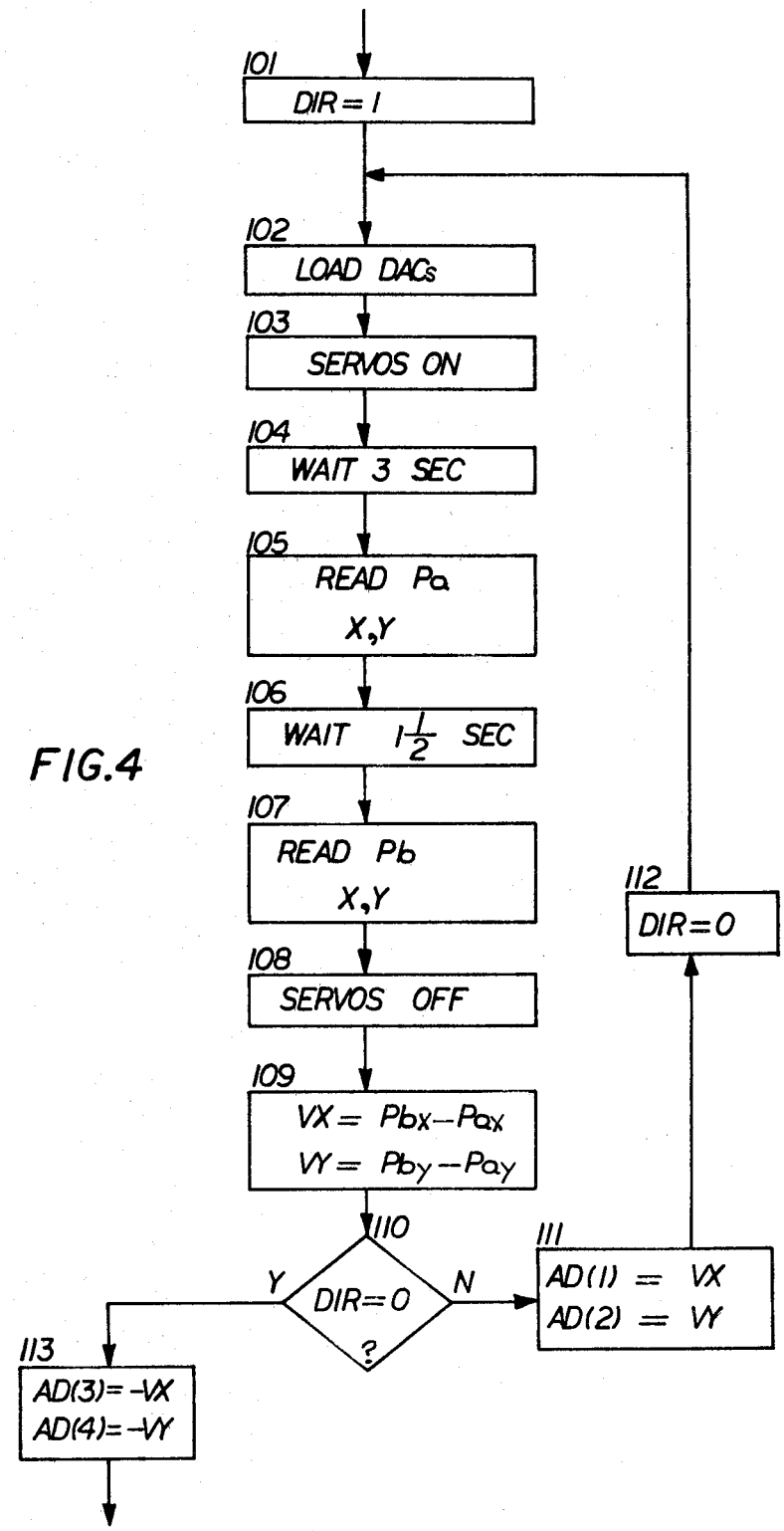
Figure 5:
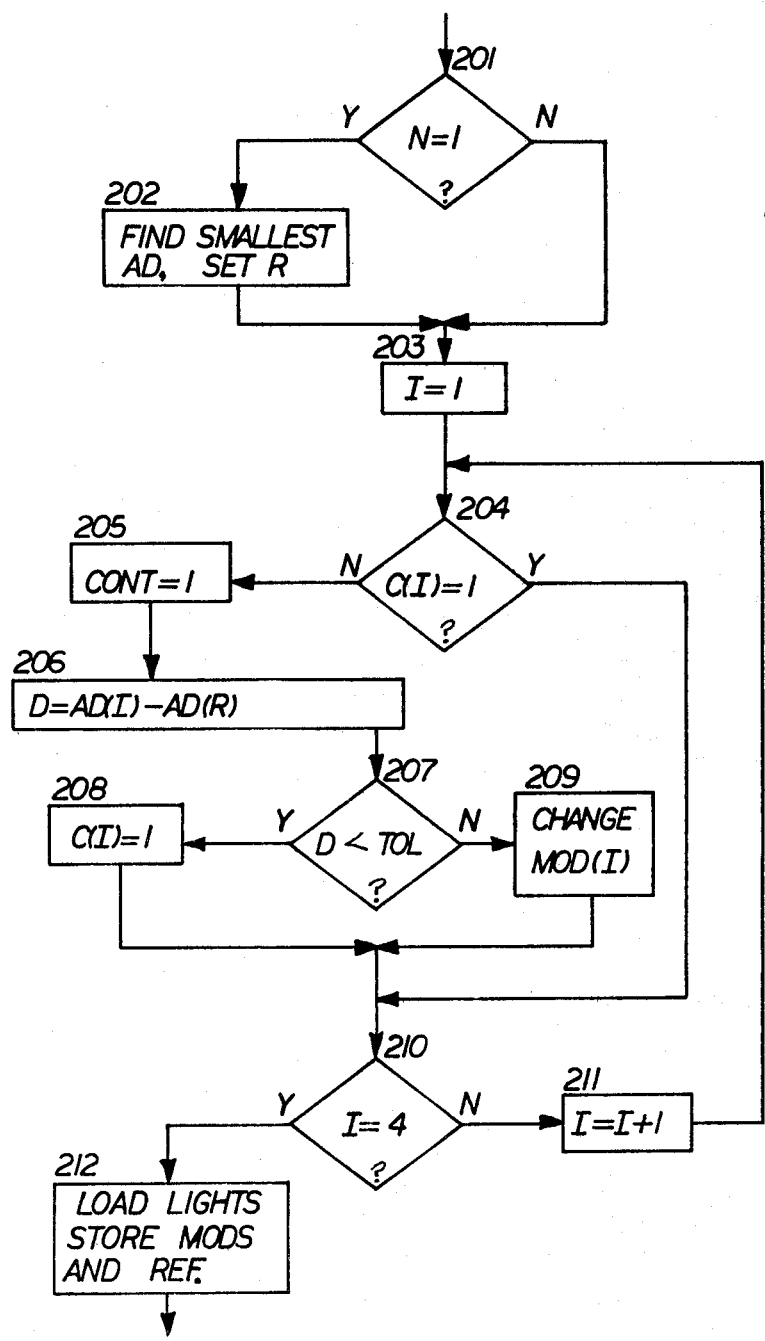
Figure 6:
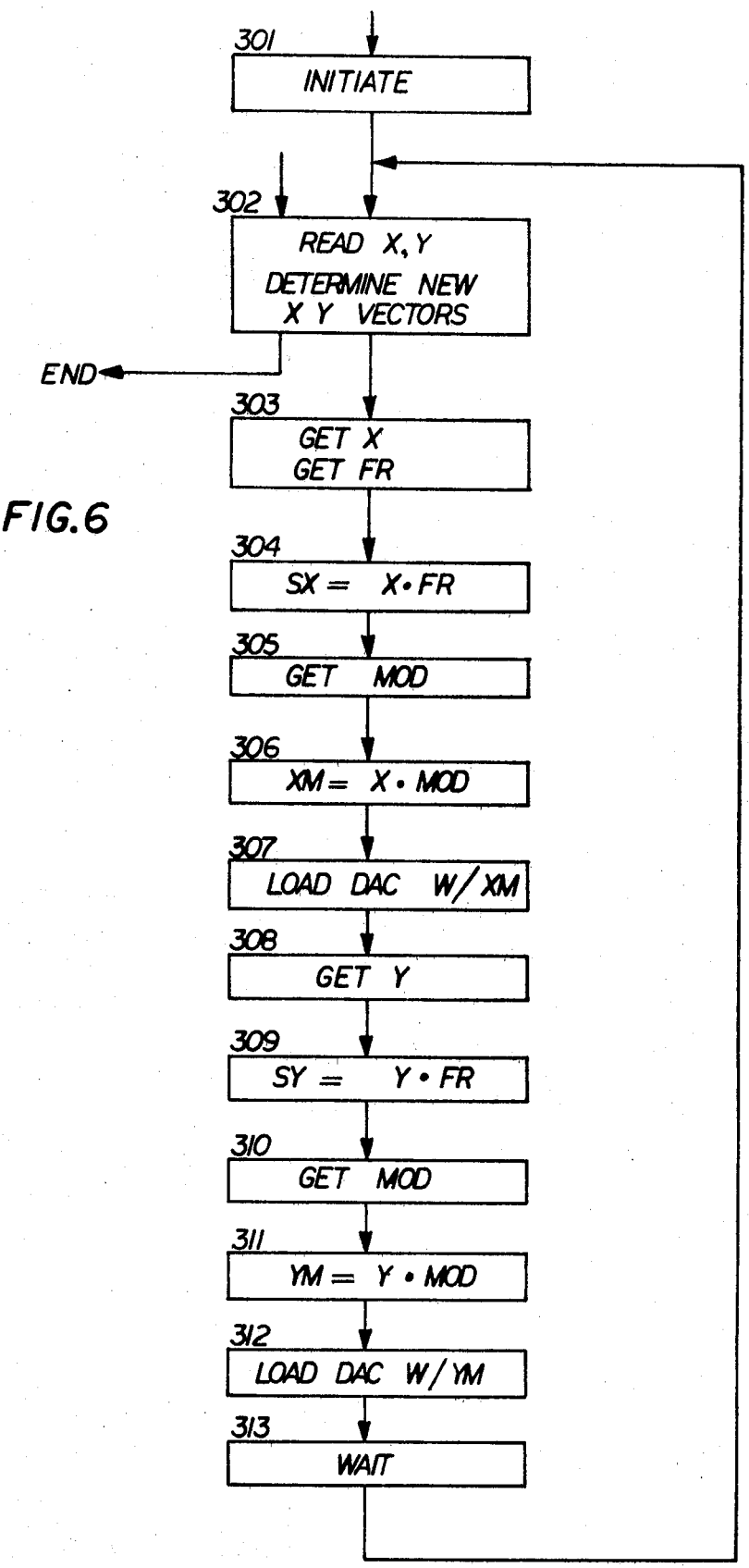
Figure 7:
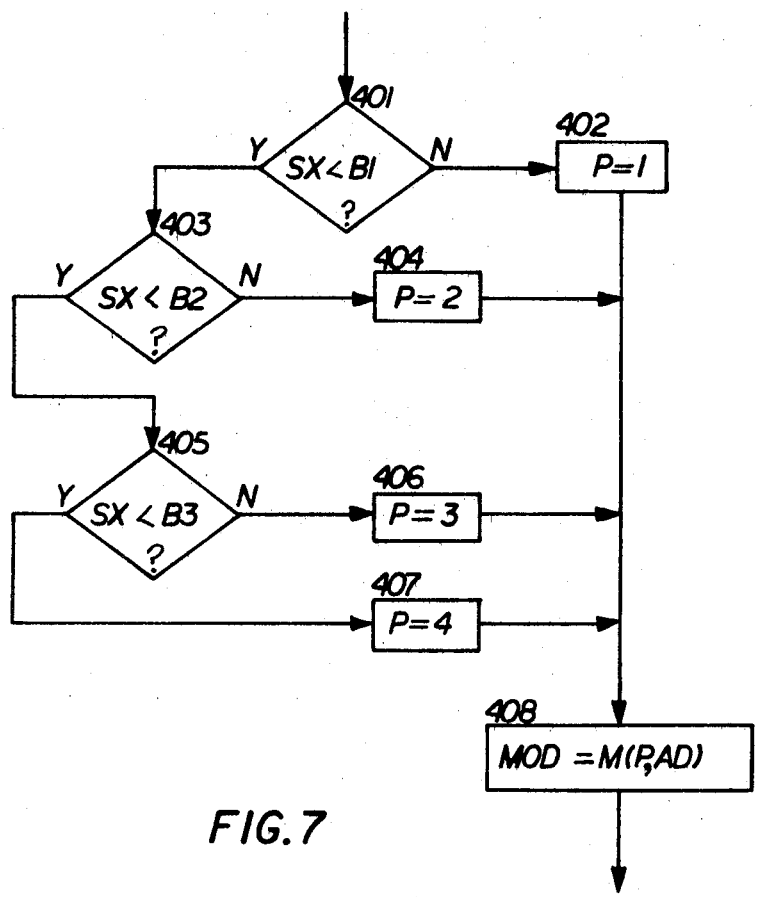

The derivation and use of the modifiers may perhaps be more readily understood through reference to FIG. 2, which is a representation of a table of modifier values as stored within the calibration memory 60. In the example shown in FIG. 2, there are four different sets of modifier values associated with four reference servo speeds. Each set includes modifiers for both positive and negative velocity commands for each servo, since servo response may differ with direction of movement. These four column identifiers (X axis/positive direction; X axis/negative direction; Y axis/positive direction/Y axis/negative direction) will occasionally be referred to as axis/directions, or AD's.

The table is accessed through reference to the direction and magnitude of the desired speed and to the servo to which it is applied. Thus, for example, if it is desired to move the X actuator in the positive direction (AD=1) at full speed (P=1), then modifier M11 wll be the appropriate value selected from the table. If, on the other hand, it is desired to move the Y servo in the negative direction (AD=4) at one-fifth speed (P=3), then modifier M43 2ill be the appropriate value selected from the table.

During operation, it will of course be a rare occurrence that the actual speed desired will exactly coincide with one of the four speeds listed on the chart. In operation, therefore, the microcomputer 42 first determines which of the four reference speeds (P=1 through P=4) the desired true speed is closest to, and then utilizes that speed in accessing a modifier value from the table. The modifiers are used to change the vector commands calculated by the microcomputer 42 by multiplying each of the vector commands by its associated modifier, selected as indicated above, to provide a modified value. Alternatively, the microcomputer could be programmed to interpolate between listed modifier values in accordance with actual desired speed in a given axis/direction.

The table of modifier values stored within the calibration memory 60 have values ranging from 0 to 1, where one of the values in each row will, in fact, be unity. These modifiers represent the percentage of a given signal which must be applied to that axis in that direction to cause movement at a speed equal to the speed at which the slowest axis/direction responds to that signal. If, for example, the modifier M21 is equal to 1.00, then modifiers M11, M31, and M41 will be less than 1, and will have values representing the percentage of the full speed signal which must be applied to the respective axis/directions to cause movement at a velocity equal to the velocity at which the Y servo will respond in the positive direction to that full speed command.

These axis/direction modifiers are determined in a calibration procedure undertaken during setup of the system and thereafter as necessary. Generally stated, the calibration procedure involves the application of the same velocity command in all four axis/directions. This is done by applying one of four fixed reference speed signals to the reference inputs of both digital-to-analog converters 48 and 50, and loading a full scale vector command into both DAC's. The response of the servos is then determined by measuring the position changes along each axis/direction after a fixed interval of time. The vector commands applied to the respective axis/directions are then modified in such a direction as to conform the speeds of the three faster axis/directions to the speed of the slowest axis/direction. The modified vector commands are then reapplied to the servos for each axis/direction, with their responses again being determined. This procedure is carried out iteratively until the responses of the three axis/directions being modified conform to the response of the axis/direction which was initially the slowest. Modifiers for all four axis/directions for the applied reference speed are then stored, where the modifiers correspond to the vector commands applied to the respective axis directions which produced the identical responses therefrom. The output of A/D 62 is also stored to indicate what A/D output represents that reference speed. This calibration procedure is carried out at as many different reference speeds as desired; four, in the example illustrated in FIG. 2.

For each reference speed, a different predetermined fixed reference signal is applied to the reference inputs of the DAC's 48 and 50. As stated previously, the reference inputs to the two digital-to-analog converters 48 and 50 were in the past connected directly to the wiper arm of the feed rate potentiometer 36. In the embodiment illustrated in FIG. 1, the reference inputs to the two digital-to-analog converters 48 and 50 are instead connected to the output of a 5:1 analog signal multiplexer, one input of which is connected to the wiper arm of the feed rate potentiometer 36. The remaining four inputs to the multiplexer are connected to the four outputs to a reference generator 64 which provides four voltages at its outputs representative of selected feed rates corresponding to the feed rates for which modifier values will be determined. The analog multiplexer 64, which is characterized in FIG. 1 as a series of five solid state switches connecting the five inputs to a common output, will be controlled by the microcomputer 42 through a latch circuit 68. One and only one of the inputs of the analog multiplexer 64 will be coupled to its output in accordance with a binary control word supplied thereto by the latch 68. Each solid state switch will be controlled by a corresponding bit of the control word. During the normal operation, the microcomputer 42 will load a control word into the latch 68 such that the feed rate signal provided by the feed rate potentiometer 36 will be connected to the reference inputs to the digital-to-analog converters 48 and 50. During the calibration procedure to be described hereinafter, however, the microcomputer 42 will load different control words into the latch 68 so as to connect a respective one of the outputs to the reference generator 66 to the reference inputs of the digital-to-analog converters.

As stated previously, a portion of the control word loaded into the latch 68 also controls the state of multiplexer 35. One bit of the control word controls switches S1 and S3, whereas another controls switches S2 and S4.

The reference generator 66 may comprise a resistive divider including a number of precision resistors connected in series between the +V supply and ground, with the voltages at the junctions of the series-connected resistors representing the outputs of the reference generator. The values of the precision resistors are selected to provide the desired reference voltages at the output.

The derivation of the calibration chart, together with the use thereof during normal operation of the system will now be described in greater detail through reference to the flow charts of FIGS. 3-7.

CALIBRATION PROCEDURE

The calibration procedure, as described above, is performed prior to normal operation of the system in order to derive a table of modifier values such as that shown in FIG. 2. The calibration procedure includes the following steps:

| Steps | Description |
|---|---|
| 001 | Initiation of the calibration procedure. In this step, all counting variables are reset to initial values and all cutting processes disabled. |
| 002 | The counting variable P, which represents the reference feed rate at which the calibration process will be carried out, is set equal to 1. A control word is then loaded into the latch 68 such that the output of the reference generator 66 corresponding to full speed is connected to the reference inputs to the X and Y digital-to-analog converters 48 and 50. |
| 003 | The counting variable N, which identifies the number of iterations which have been performed for this calibration speed, is initialized to one. In addition, all modifiers in the calibration table stored within the calibration memory 60 are set to an initial value of 1. An array of values C(1) to C(4) is also initialized. Each position in this array corresponds to a respective axis/direction, and has a binary value of 1 or 0, indicating whether or not that particular axis/direction is, or is not, properly calibrated at the feed rate then being calibrated. In this step the elements of the array are set to initial values 0, indicating that all four axis/directions require calibration. Finally, a "continue" variable CONT is set to an initial value of 0. This variable is tested at a later stage of the program in order to decide whether to continue an iterative "change modifier" loop. |
| 004 | A subprocedure is called for measuring the axis/direction responses to applied feed rate signals. This subprocedure will be described hereinafter with reference to FIG. 4. |
| 005 | Another subprocedure is called (described hereinafter with reference to FIG. 5) for comparing the responses of the various axis/directions and for then changing the modifiers as necessary to equalize these responses. Also, the continuation variable CONT is set equal to 1, unless the servo responses have been so similar that no change in modifiers have been required. |
| 006 | The continuation variable CONT is compared with 1. If the continuation variable CONT is equal to 1, then the modifiers were changed in this iteration, hence further iterations are necessary. If CONT is not equal to 1 (i.e., is still equal to 0), then there have been no changes in the modifiers in the last iteration, hence no further iterations are necessary. In this event the program jumps to step 009. |
| 007 | In this step, the iterative counting variable N is compared with 10; which is the maximum number of iterations allowed. If N is equal to 10, indicating that ten iterations have been performed, then the program jumps to step 009 even though CONT was set to 1 in step 005. |
| 008 | If the comparison in step 007 indicates the ten iterations have not been performed, then the counting variable N is incremented by 1, and the "continue" variable CONT is reset to 0. The program then returns to step 004 to begin another iteration. |
| 009 | The reference feed rate variable P is compared with 4 to determine whether or not the calibration procedure has been carried out for all four reference feed rates. If P is equal to 4, then calibration is complete and the program jumps to step 011. |
| 010 | In the event that P is not equal to 4, the P number is incremented by 1 and the program returns to step 003 to begin a calibration procedure at the next reference feed rate, indicated by the then P value. |
| 011 | Upon arriving at this step, the calibration procedure is complete. The operator is advised of this by causing a "calibration complete" lamp to be illuminated. The microcomputer 42 then awaits further operator instructions. |

MEASURE AXIS/DIRECTION RESPONSE

This subprocedure, which is performed iteratively during the calibration procedure, commands movements of the servos in each direction at the calibration speed, and then measures the response of the various servos in the various directions to these commands. The subprocedure includes the following steps:

| Steps | Description |
|---|---|
| 101 | A direction variable DIR is set equal to "1", indicating that both servos are to be driven in a positive direction. |
| 102 | The digital-to-analog converters 48 and 50 are loaded with vector commands having magnitudes corresponding to the modifiers stored within the calibration memory 60 at the speed then being calibrated and in the direction indicated by the variable DIR. On the first iteration, these modifiers will all have a value of 1 (i.e., will be at full scale), since they were reset to 1 in step 003. The "sign" portion of the vector command is set to the present DIR value. |
| 103 | The X and Y servos 14 and 16 are energized by loading latch 68 with a control word, causing the 2:1 analog multiplexer 35 to connect the outputs of the X and Y digital-to-analog converters 48 and 50 to the inputs to the respective servos. |
| 104 | The procedure waits for three seconds to permit the servos to accelerate the driven object 18 to a steady state speed and to permit spurious system oscillations to damp out. |
| 105 | A starting position PA is determined by reading the contents of the X and Y position counters 56 and 58. |
| 106 | The program waits one and one-half seconds for the servos to move the object 18 from the first position to a second position. |
| 107 | The microcomputer determines the second position PB by again reading the contents of the X and Y position counters 56 and 58. |
| 108 | The servos are switched off by reloading latch 68 with a word causing the analog multiplexer 35 to open circuit the inputs to the X and Y servos 14 and 16. |
| 109 | The velocities in the X and Y directions, VA and VB, are established by subtracting the X and Y values of position B from the respective X and Y values at position A. |
| 110 | The variable DIR is examined to determine whether or not it is 0 (indicating a negative direction of servo movement). If it is, then the program jumps to step 113. (If not, then the direction variable must be set to "0" and steps 102-109 repeated.) |
| 111 | Since the direction variable is not "0", the X and Y velocities determined in step 109 correspond with AD(1) and AD(2). Consequently, in this step the |

| Steps | Description |
|---|---|
| | variables AD(1) and AD(2) are assigned values VX and VY, respectively. |
| 112 | The direction variable is now set equal to "0", and the program returns to step 102. In the succeeding performance of steps 102-109, the servos will be commanded to move in a negative direction, and the change in position after a one and one-half second interval again determined. |
| 113 | To arrive at this step, the direction must have been equal to negative at step 110. Position B will therefore be smaller than position A. Consequently VX and VY will be negative in this circumstance. Since all "AD" readings should have the same polarity to simplify comparison, variables AD(3) and AD(4) are assigned values of "−VX" and "−VY", respectively. |

CHANGE MODIFIER SUBPROCEDURE

The purpose of this subprocedure is to examine the AD values determined in the MEASURE AD subprocedure described above, and to determine updated modifier values for the calibration chart in a direction so as to equalize these values. More specifically, the speeds of the three faster axis directions are reduced to the speed of the slowest axis direcion by reducing the modifiers for those three higher speed axes below 1. The procedure includes the following steps:

| Steps | Description |
|---|---|
| 201 | The value of N is compared with 1. (N, again, is a counting variable used to keep track of how many iterations of the calibration procedure have been performed for a given reference feed rate.) If N is equal to 1, then this is the first pass through the modifying AD subprocedure. In this event, program flow continues on with step 202. Otherwise, (i.e., if N is not equal to 1) the program jumps to step 203. |
| 202 | In this step the four AD values are compared with one another to locate the slowest axis/direction. An integer variable R is set equal to the column of the chart (FIG. 2) corresponding to that axis/direction. Thus, if AD(3) is the slowest of the four, then the R value is set equal to three. This R value remains unchanged in succeeding passes through the CHANGE MODIFIER subroutine; since N will not be equal to 1 in subsequent passes, step 202 will be bypassed. |
| 203 | An integer counting variable I is set to an initial value of 1. This I value identifies the axis/direction being examined presently. |
| 204 | The element of the calibration array C(I) is tested. (It will be remembered that this array was initialized to zero in step 003.) If this element has a value of 1, then the axis/direction then being examined is calibrated, and steps 205-209 may be skipped. In this event, the program jumps to step 210. Otherwise, program flow continues with step 205. |
| 205 | In this step, the continuation variable CONT is set equal to 1, indicating that at least one axis/direction has been modified in this iterative loop. It will be recalled that this variable CONT is tested in step 006 to determine whether further iterations of the calibration procedure are required for this reference feed rate. |
| 206 | A real variable D is set equal to the difference between the velocities measured in the axis/direction presently being examined (AD(I)) and the reference axis/direction (AD(R)). If I is equal to R, then of course the two values will be equal and D will have a value of 0. For all other axes, however, D will have varying values which approach 0 as successive passes through the iterative calibration procedure are performed. |
| 207 | The D value measured for the axis/direction I is compared with a tolerance. If this D value is less than the tolerance, indicating that the speed of the axis I is very close to the speed of the reference axis R, then program continues with step 208. Otherwise, the program jumps to step 209. |
| 208 | Since the speed of the reference axis R and the axis being examined I are within the tolerance, calibration of this axis/direction is complete. In this step the variable indicating the calibration status of this axis/direction (C(I)) is set equal to a value of 1. The program then jumps to step 210. |
| 209 | If it is determined in step 207 that the difference in speeds D is greater than the tolerance, then the axis/direction I is not calibrated, and the modifier for that axis/direction must be changed. In this step, that modifier M(P, I) is appropriately modified. The size of the change in the modifier is related to the present value of the counting variable N, and the direction is dependent upon the polarity of the difference signal D. In the first iterative loop, the change is 25% (i.e., .25) and the direction will be such as to reduce the modifier, since D will necessarily be positive. (This is because the reference axis is selected to be the slowest of all four, hence the results of the subtraction of step 206 will necessarily be positive.) In succeeding loops, the amount of the increment is successively reduced by factors of 2. Thus, when N equal 2, the increment is .25 divided by 2. Generally stated, the increment will be equal to $.25 \times 2^{1-n}$. This increment will be added to or subtracted from the modifier M(P, I), depending upon the sign of the difference D. |
| 210 | The counting variable I is tested to see if it is equal to 4. If I is equal to 4, then all four axis/directions have been examined, hence the CHANGE MODIFIER subprocedure is essentially complete. In this event, the program jumps to step 212. Otherwise, the program flow continues with step 211. |
| 211 | In this step the counting variable I is incremented by 1, and the program returns to step 204. Thus, steps 204-209 are repeated for the next axis/direction. This will continue until I is equal to 4 at which point the procedure will be directed to step 212 by the step 210. |
| 212 | Upon arriving at step 212, all four axis/directions will have had their modifiers appropriately changed. The program then stores these modifiers and the output of A/D 62 in the correct locations in the calibration memory, and displays the present calibration status of the four axis/directions (at the reference feed rate then being examined) on four lights provided on the panel of the apparatus at a location visible to the operator. This is accomplished by loading the contents of the C(I) array, with the individual elements of the array controlling individual ones of the lights. The illumination state of the lamps will be directly dependent upon the binary state of corresponding elements of the array. Hence, if all four axis/directions are calibrated, then all elements of the C(I) array will have binary values of 1, and all four lamps will be illuminated. |

OPERATING PROCEDURE

Upon the conclusion of the calibration procedure, the apparatus is prepared for normal operation. The operator will select a particular geometric outline defining the path which it is desired to move the object 18 along. The operator then manually moves the object 18 to the desired starting position, and initiates the operating procedure, which includes the following steps:

| Steps | Description |
|---|---|
| 301 | Upon initially entering the operating procedure, the microcomputer resets the X and Y position counters 56 and 58 to zero, and loads the latch 68 with a control word causing the analog signal multiplexer 64 to apply the feed rate signal FR to the reference inputs to the X and Y digital-to-analog converters 48 and 50. In addition, the microcomputer provides a control signal to the analog signal multiplexer 35 (via latch 68) to close the switches associated with the outputs of the X and Y digital-to-analog converters 48 and 50, thereby providing these signals to the inputs to the X and Y servos 14 and 16. |
| 302 | In this step, the microcomputer reads the present position of the object 18 by reading the contents of the X and Y position counters 56 and 58, and determines new X and Y vectors defining the direction which the object 18 must move in order to follow or return to the desired path. If, in a subsequent pass through this step, it is determined that the shape is complete, the apparatus exits the operating procedure and returns to a wait stage, wherein all cutting processes are disabled pending further operator commands. |
| 303 | In this step, the microcomputer triggers the analog-to-digital converter 62 to convert the analog feed rate signal FR into a digital word for entry into the microcomputer. The microcomputer also loads the X vector determined in step 302 into the operating registers of the microcomputer. |
| 304 | A value SX if derived by multiplying the X vector value by the feed rate FR. This value SX defines the actual desired speed of the object in the X direction. |
| 305 | The microcomputer employs a GET MOD subprocedure to select an appropriate modifier from the calibration table contained within the calibration memory 60. This subprocedure is shown in greater detail in FIG. 7 and will be described hereinafter. |
| 306 | A modified X value XM is derived by multiplying the X vector determined in step 302 by the modifier value derived in step 305. |
| 307 | Digital-to-analog converter 48 is loaded with the modified X vector value XM. |
| 308 | The microcomputer loads the Y vector value determined in step 302 into its operating registers. |
| 309 | A value SY is derived identifying the actual desired speed of the object in the Y dimension, where SY is equal to the product of the Y vector value loaded in step 308 and the feed rate FR as derived in step 303. |
| 310 | A GET MOD subprocedure is again employed to select an appropriate modifier from the calibration table stored within the calibration memory 60. |
| 311 | A modified Y vector YM is determined by multiplying the Y vector value loaded in step 308 by the modifier derived in step 310. |
| 312 | The Y digital-to-analog converter 50 is loaded with the modified Y vector derived in step 311. |
| 313 | The microcomputer now waits a predefined period of time before again reading the values of the X and Y position counters and recalculating new X and Y vectors. During this wait step the microcomputer may perform other procedures unrelated to the control of the object 18. |

GET MODIFIER SUBPROCEDURE

This subprocedure is used to select appropriate modifier values from the calibration table stored within the calibration memory 60. Since the particular axis being examined and the desired direction of movement in that axis is known, the AD number, representing a particular column of the table, will also be known. It is therefore only necessary to locate the appropriate row (i.e., P number) in order to select a given modifier value.

In this procedure, the desired speed in a given axis (as determined in either step 304 or step 309) is compared with break points located midway between the reference feed rates at which the modifier values have been derived. By comparing the desired speeds with the break points, it can be determined which of the reference feed rates the desired speed is closest to. The P value, representing the row of the table to be addressed, is then set in accordance with whichever of the reference speeds the desired speed is closest to. In the following description, the speed signal SX is being examined to identify a modifier value, however it will be appreciated that either the SX or SY signal will be used, depending upon whether the subprocedure is being executed in step 305 or step 310. The subprocedure includes the following steps:

| Steps | Description |
|---|---|
| 401 | In this step the speed signal SX (or SY) is compared with a first break point B1 located midway between the reference speeds representing the P values 1 and 2 (i.e., ADC1 and ADC2). If SX is less than this break point, then the procedure jumps to step 403. If SX is not less than this break point, however, then it is known that the speed is within the highest speed category, represented by a P value equal to 1. |
| 402 | The P value is set equal 1, and the procedure jumps to step 408. |
| 403 | In this step, the speed value is compared with the second break point B2, located midway between the reference speeds represented by the P values equal to 2 and 3 (i.e., ADC2 and ADC3). If the desired speed SX (or SY) is less than this break point, then the procedure jumps to step 405. Otherwise, the procedure continues with step 404. |
| 404 | Since the speed value is greater than the second break point B2 but less than the first break point B1, it may be concluded that the speed is closest to the reference speed identified by P = 2. The P value is therefore set equal to 2. The program then jumps to step 408. |
| 405 | In this step the speed value is compared with a third break point B3, located midway between the reference speeds identifed by P values of 3 and 4 (i.e. ADC3 and ADC4). If the desired speed SX (or SY) is less than this break point, then the procedure jumps to step 407. |
| 406 | Since the speed value is greater than the third break point B3 but less than the second break point B2, it may be concluded that the speed is closest to the reference value represented by a P value of 3. The P value is therefore set equal to 3. The procedure then jumps to step 408. |
| 407 | Since, to arrive at this step, the speed value must be less than the break point B3, it may be presumed that the speed is closest to the reference value identified by a P value of 4. The P value is therefore set equal to 4. |
| 408 | In this step the calibration memory is addressed with an address derived in accordance with the P value determined in steps 402, 404, 406 or 407, and in conjunction with the AD value which was known before entering the procedure. The variable MOD is then set equal to M(P, AD). This modifier MOD is used in either step 306 or 311 of the operating procedure, depending upon whether the GET MOD subprocedure was called at step 305 or 310. |

Although the invention has been described with respect to a preferred embodiment, it will be appreciated that various rearrangements and alterations of parts may be made without departing from the spirit and scope of the present invention, as defined in the appended claims.

What is claimed is:

1. In a system wherein at least two servos move an object in respective dimensions of movement and are controlled by velocity control signals provided by a servo control, the improvement comprising means for storing calibration signals characterizing the relationship between applied velocity control signals and the actual resulting velocity responses of the servos, and means for modifying the velocity control signals provided to said servos in accordance with said stored calibration signals so as to reduce spurious variations in object velocity which would otherwise be introduced by nonidealities of said servo responses.

2. In a system wherein at least two servos move an object in respective dimensions of movement and are controlled by velocity control signals provided by a servo control, the improvement comprising means for storing calibration signals characterizing the relationship between applied velocity control signals and the actual resulting velocity responses of the servos, and means for modifying the velocity control signals provided to said servos in accordance with said stored calibration signals so as to reduce spurious variations in object velocity which would otherwise be introduced by nonidealities of said servo responses, wherein said means for storing calibration signals comprises addressable memory means for storing a table of modifiers and wherein said means for modifying comprises means for addressing said memory means to select particular ones of said modifiers from said table, and means for multiplying the velocity control signals by the modifiers thus selected to provide the modified velocity control signals.

3. The improvement of claim 2 wherein said memory means stores a modifier for each direction of movement of each servo at each of a plurality of reference speeds, and wherein said means for addressing said memory means comprises means for addressing said memory means in accordance with the direction and magnitude of the velocity control signal to be modified, and the servo to which the modified velocity control signal is to be applied, whereby said memory provides the modifier respectively associated with said velocity control signal.

4. In a system wherein at least two servos move an object in respective dimensions of movement and are controlled by velocity control signals provided by a servo control, the improvement comprising means for storing calibration signals characterizing the relationship between applied velocity control signals and the actual resulting velocity responses of the servos, means for modifying the velocity control signals provided to said servos in accordance with said stored calibration signals so as to reduce spurious variations in object velocity which would otherwise be introduced by nonidealities of said servo responses, and means for deriving said calibration signals, said deriving means including means for applying predetermined velocity control signals to all of said servos, means for indicating positional changes of said object in the directions controlled by each said servo in response to said velocity control signals, and means for deriving said calibration signals in accordance with the positional changes of said object due to different servos.

5. In a system wherein at least two servos move an object in respective dimensions of movement and are controlled by velocity control signals provided by a servo control, the improvement comprising means for storing calibration signals characterizing the relationship between applied velocity control signals and the actual resulting velocity responses of the servos, means for modifying the velocity control signals provided to said servos in accordance with said stored calibration signals so as to reduce spurious variations in object velocity which would otherwise be introduced by nonidealities of said servo responses, means for indicating positional changes of said object in the directions controlled by each said servo in response to applied velocity control signals, and computer means programmed to:

(i) initially provide equal velocity control signals for application to said at least two servos, (ii) apply the velocity control signals to the servos, (iii) determine the response of said servos to the velocity control signals by comparing positional changes of said object due to different servos, as indicated by said positional change indicating means, (iv) continue with the next step if the responses of the servos are not essentially the same, otherwise jump to step (vi), (v) modify the velocity control signals in a direction to reduce the differences between the responses of the servos, and return to step (ii), and (vi) store calibration signals in said calibration memory corresponding with the resulting velocity control signals.

6. In a system wherein at least two servos move an object in respective dimensions of movement and are controlled by velocity control signals provided by a servo control, the improvement comprising means for storing calibration signals characterizing the relationships between applied velocity control signals and the actual resulting velocity responses of the servos, and means for modifying the velocity control signals provided to said servos in accordance with said stored calibration signals so as to reduce spurious varations in object velocity which would otherwise be introduced by nonidealities of said servo responses, wherein said servo control comprises vector control means providing vector commands for each of said servos, said vector commands being normalized so that their vector sum is substantially constant, feed rate control means for providing a feed rate control signal indicative of the desired speed of said object, and multiplier means for multiplying each said vector command by said feed rate control signal to provide product signals serving as said velocity control signals, and wherein said means for modifying said velocity control signals comprises means in said vector control means for modifying said vector commands in accordance with said stored calibration signals and for providing said modified vector commands to said multiplier means.

7. The improvement as set forth in claim 6, wherein said vector control means comprises computer means programmed to perform the following steps:

determine said normalized vector commands, determine the present value of the feed rate control signal, multiply each said normalized vector command by said value of said feed rate control signal to provide respective speed signals each indicative of the desired true speed of said object in the direction controlled by the corresponding vector command, address said memory to select modifiers for each normalized vector command in accordance with the servo associated therewith and the magnitude and direction of the corresponding speed signal, multiply each vector command by its associated modifier to provide said modified vector commands, and provide said modified vector commands to said multiplier means.

8. The improvement as set forth in claim 7, wherein said system further includes position indicating means for indicating present position of said object and wherein said computer means is further programmed to periodically read the present position of said object from said position indicating means and perform said steps to determine updated modified vector commands in accordance with said present position.

9. In a system wherein plural servos respond to respective velocity commands to move an object along respectively associated axes, said system comprising means for providing a feed rate command indicative of desired object velocity, means for providing directional vector signals each indicating the extent of movement along an axis controlled by an associated servo, said directional vector signals being scaled such that the vector sum of the movements indicated thereby is substantially constant; and means for multiplying each of said directional vector signals by said feed rate to provide a corresponding velocity command for application to the corresponding servo;

the improvement wherein said vector signal providing means modifies said vector signals in accordance with the predetermined nonuniform rate response characteristics of said servos so as to reduce spurious variations in object velocity which would otherwise be introduced by said nonuniform rate response characteristics of said servos.

10. The improvement of claim 1, wherein said object being moved is a flame cutter.

11. In a system wherein at least two servos move a flame cutter in respective dimensions of movement and are controlled by velocity control signals whose vector sum is substantially constant, said velocity control signals being provided by a servo control device, the improvement comprising means for storing calibration signals characterizing the manner in which the actual velocity responses of the servos vary with the applied velocity control signals, and means for modifying the velocity control signals provided to said servos in accordance with said stored calibration signals so as to keep said flame cutter moving at a substantial constant velocity despite any nonuniform velocity response characteristics of said servos.

12. The improvement of claim 9, wherein said object being moved is a flame cutter.

* * * * *